United States Patent
De Gaillande et al.

(10) Patent No.: US 12,291,012 B2
(45) Date of Patent: May 6, 2025

(54) HOT FOIL STAMPING PRESS

(71) Applicant: BOBST MEX SA, Mex (CH)

(72) Inventors: Christophe De Gaillande, Les Monts-de-Corsier (CH); Christoph Vollmer, Vevey (CH); Haoming Song, Shanghai (CN)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 17/593,350

(22) PCT Filed: Mar. 20, 2019

(86) PCT No.: PCT/CN2019/078801
§ 371 (c)(1),
(2) Date: Sep. 16, 2021

(87) PCT Pub. No.: WO2020/186470
PCT Pub. Date: Sep. 24, 2020

(65) Prior Publication Data
US 2022/0184935 A1 Jun. 16, 2022

(51) Int. Cl.
*B32B 37/00* (2006.01)
*B32B 27/10* (2006.01)

(52) U.S. Cl.
CPC ............ *B32B 37/025* (2013.01); *B32B 27/10* (2013.01); *B32B 37/0046* (2013.01); *B32B 2255/10* (2013.01); *B32B 2255/205* (2013.01)

(58) Field of Classification Search
CPC ... B32B 37/025; B32B 27/10; B32B 37/0046; B32B 2255/10; B32B 2255/205;
(Continued)

(56) References Cited

U.S. PATENT DOCUMENTS 3,721,185 A * 3/1973 Rambausek .......... B41F 19/062
101/25
4,516,493 A * 5/1985 Schemenauer ....... B41F 19/068
83/52
(Continued)

FOREIGN PATENT DOCUMENTS

CN 102762383 A 10/2012
CN 103097135 A 5/2013
(Continued)

OTHER PUBLICATIONS

Mike Bacidore, "Do You Actually Need Operator Buttons?", Aug. 2, 2017. www.controldesign.com Accessed Dec. 11, 2023 at <https://www.controldesign.com/sensing/sensors/article/11316563/do-you-actually-need-operator-buttons> (Year: 2017).*
(Continued)

*Primary Examiner* — Alex B Efta
*Assistant Examiner* — Alexander S Wright
(74) *Attorney, Agent, or Firm* — Bookoff McAndrews, PLLC

(57) ABSTRACT

A hot foil stamping press with a pressing table (10) on which a sheet can be advanced, a pressing system (20) for pressing a foil (14) onto the sheet, a guiding system (18) for guiding the foil (14) over the sheet, the guiding system (18) defining a foil transportation path which extends across the path along which the sheet is being advanced, a holder (11) for receiving a supply (12) of foil, and a discarding system (22) for the used foil, the holder being arranged at an operator side of the press.

20 Claims, 2 Drawing Sheets

Figure 1:
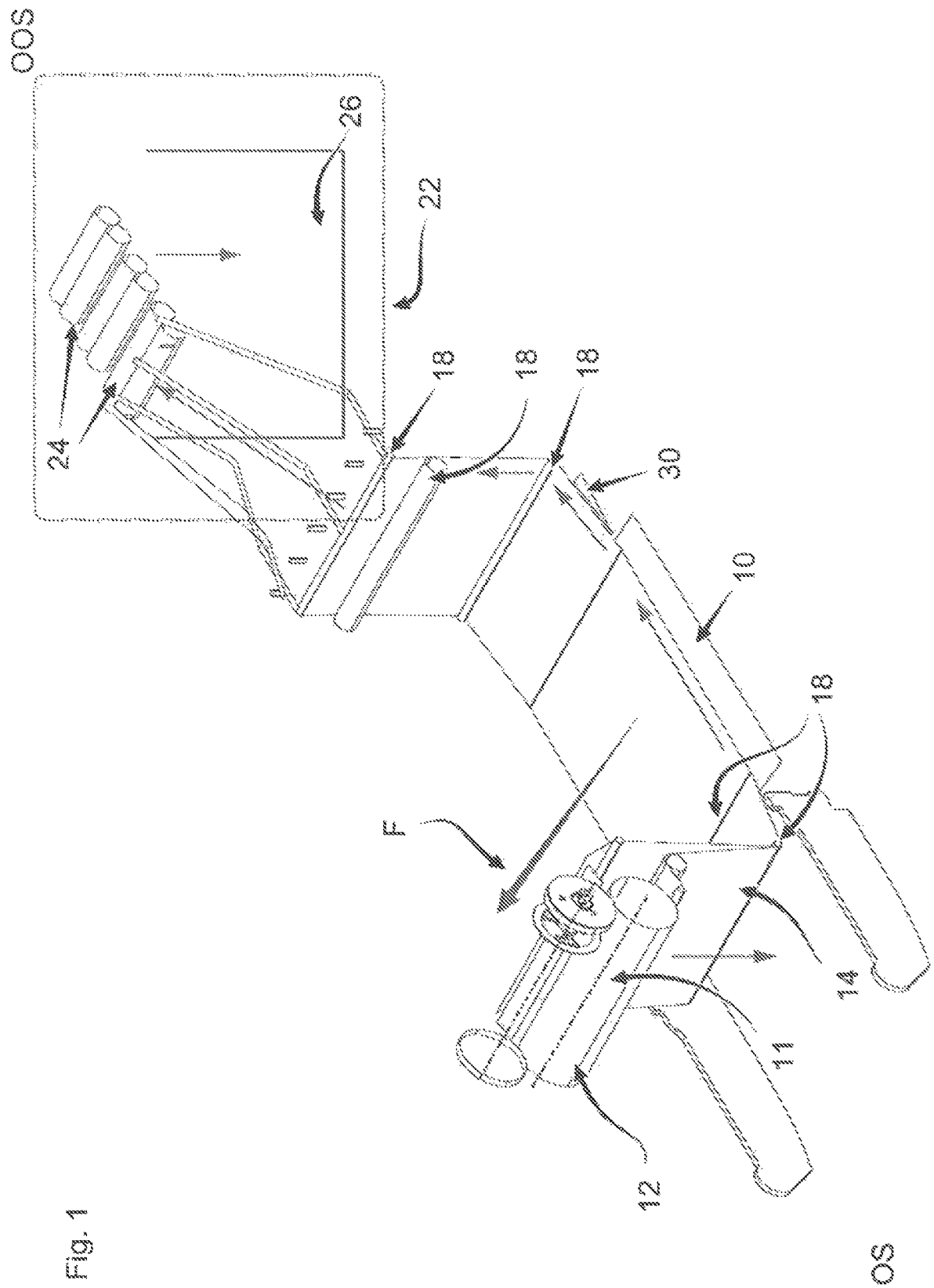

(58) Field of Classification Search
CPC ...... B41F 16/006; B41F 19/068; B41F 16/00; B41F 16/0046; B41P 2219/22; B41P 2219/21; B44F 16/0046; B44C 1/14
See application file for complete search history.

(56) References Cited

U.S. PATENT DOCUMENTS

| | | | |
|---|---|---|---|
| 5,704,292 A | 1/1998 | Rebeaud | |
| 8,881,649 B2* | 11/2014 | De Gaillande | B41F 1/30 101/27 |
| 9,027,473 B2* | 5/2015 | Fornay | B65H 29/686 101/27 |
| 2004/0206254 A1 | 10/2004 | Both et al. | |
| 2006/0219108 A1* | 10/2006 | Dorrell | B41F 19/068 101/178 |
| 2009/0211468 A1 | 8/2009 | Steuer | |
| 2012/0247352 A1 | 10/2012 | Fornay et al. | |
| 2013/0160663 A1 | 6/2013 | De Gaillande | |
| 2013/0187333 A1 | 7/2013 | Cuennet et al. | |
| 2015/0075394 A1* | 3/2015 | Sun | B65H 16/106 242/564.5 |
| 2016/0152021 A1* | 6/2016 | Arque Saleta | B41F 19/02 428/192 |

FOREIGN PATENT DOCUMENTS

| | | |
|---|---|---|
| CN | 103097136 A | 5/2013 |
| CN | 103097137 A | 5/2013 |
| CN | 104290438 A | 1/2015 |
| CN | 102762383 B | 5/2015 |
| CN | 107297949 A | 10/2017 |
| JP | S49-056720 A | 6/1974 |
| JP | S4956720 A | 6/1974 |
| JP | S49106410 A | 10/1974 |
| JP | S5134809 U | 3/1976 |
| JP | 60178053 A * | 9/1985 ............. B41F 19/06 |
| JP | S60178053 A | 9/1985 |
| JP | S61-076369 A | 4/1986 |
| JP | S6176369 A | 4/1986 |
| JP | S61125895 A | 6/1986 |
| JP | 07290685 A | 11/1995 |
| JP | H07290685 A | 11/1995 |
| JP | H09118055 A | 5/1997 |
| JP | 2003136797 A | 5/2003 |
| JP | 2003196600 A | 7/2003 |
| JP | 2004314175 A | 11/2004 |
| JP | 2009028967 A | 2/2009 |
| JP | 2012240705 A | 12/2012 |
| JP | 5134809 B2 | 1/2013 |
| JP | 2013514201 A | 4/2013 |
| JP | 2013542866 A | 11/2013 |
| JP | 2013544197 A | 12/2013 |
| JP | 2015020436 A | 2/2015 |
| JP | 2017177746 A | 10/2017 |
| TW | 201219229 A | 5/2012 |
| TW | 201302591 A | 1/2013 |
| WO | 2011072807 A1 | 6/2011 |
| WO | 2012034645 A1 | 3/2012 |
| WO | 2012034649 A1 | 3/2012 |

OTHER PUBLICATIONS

International Search Report issued Nov. 7, 2019 in corresponding International Application No. PCT/CN2019/078801 (3 pages).

* cited by examiner

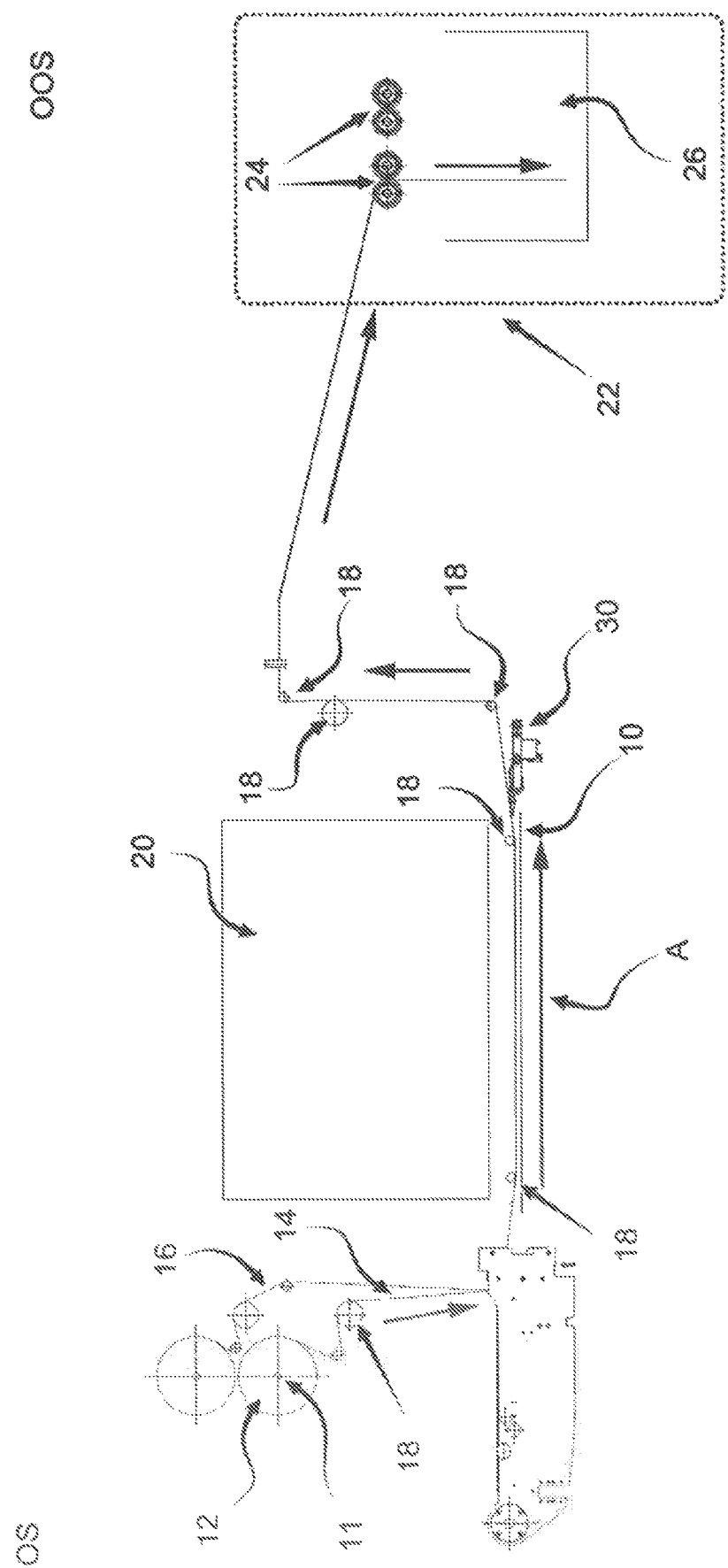

HOT FOIL STAMPING PRESS

CROSS-REFERENCE TO RELATED APPLICATION(S)

This application is a National Stage under 35 U.S.C. § 371 of International Application No. PCT/CN2019/078801, filed Mar. 20, 2019, the contents of which is incorporated by reference in its entirety.

The invention relates to a hot foil stamping press with a pressing table on which a sheet can be advanced, a pressing system for pressing a foil onto the sheet, a guiding system for guiding a foil over the sheet, the guiding system defining a foil transportation path which extends across the path along which the sheet is being advanced, a holder for receiving a supply of foil, and a discarding system for the used foil.

The sheet can be cardboard or paper, and the foil is either a metallized plastic foil or a thin metal foil. The pressing system presses the foil onto the surface of the sheet so that part of the foil is transferred to the sheet where it adheres.

The foil typically is provided in the form of a roll on a bobbin. The used portion of the foil is typically rewound on another bobbin.

As the rewinding is critical to a certain extent, it needs more intervention, and therefore the discarding system for the used foil is arranged on the front of the machine, the operator side, while the supply of foil is arranged at the back of the machine, opposite to the operator side.

The object of the invention is to reduce the amount of effort required by an operator to operate the machine.

To this end, the invention provides in a machine as defined above that the holder is arranged at an operator side of the press. The main advantage of a hot foil stamping press with this layout is that the operator does not have to bring the new foil to the back of the machine if a replacement has to take place.

According to an aspect of the invention, the discarding system comprises a brush system for removing used foil from the press. It is also possible that the discarding system comprises a waste foil container. Thus, the invention uses an entirely new concept of discarding the used foil. In the prior art, the used foil is rewound on a bobbin. As the used foil cannot be rewound easily, operator invention is often required. If there is a more severe problem, the operation of the machine has to be stopped so that the operator can remove the waste foil. According to the invention, the waste foil is now simply withdrawn from the machine and no longer rewound but simply discarded. No operator intervention is necessary to make sure that the waste foil is properly rewound.

According to another aspect of the invention, a blower for separating the foil from the sheet is provided, the blower being arranged at the side of the discarding system. The blower can thus act on the used foil. Accordingly, the blower settings are much less critical than with a prior art layout of the machine where it acts on the new foil; with the new layout, any damage which occurs at the foil because of the operation of the blower occurs at the used foil.

The pressing system preferably comprises a platen system.

The invention will now be described with reference to the enclosed drawings. In the drawings, FIG. 1 is a schematic view of part of a hot foil stamping press with the layout according to the invention; and FIG. 2 is a schematic side view of the hot foil stamping press shown in FIG. 1.

In FIGS. 1 and 2, the essential parts of a hot foil stamping press are shown. It comprises a pressing table 10 on which a sheet, in particular consisting of paper or cardboard, can be advanced along a feeding direction F. In FIG. 2, the feeding direction is perpendicular to the plane of the cross section. The sheet advanced in the feeding direction F is not shown here for better clarity.

A schematically shown holder 11 is provided for holding a supply 12 of foil 14. Supply 12 can be in the form or a roll or bobbin on which foil 14 is wound.

Supply 12 is arranged on a front side of the machine (referred to as operator side, "OS"). The front or operator side of the machine is the side where the control elements used for adjusting the settings of the machine are arranged.

The foil 14 is a thin foil from plastic which has been metallized, or a thin metal foil. With the hot foil stamping press, certain portions of the foil are applied to the sheet.

As can be seen in FIGS. 1 and 2, a second foil 16 can also be supplied.

Foil 14 is guided over the sheet by means of a guiding system comprising a plurality of rollers 18. It is essential that the foil is guided over the sheet in a direction which is transverse and in particular perpendicular to the feeding direction F of the sheet (see the orientation of arrow A in the region of pressing table 10, with arrow A designating the direction in which the foil is advanced over the pressing table).

For pressing foil 14 onto the sheet and for making part of the foil adhere to the sheet, a pressing system is provided which is schematically shown in FIG. 2 with reference numeral 20. Pressing system 20 comprises a platen press.

On the backside of the machine, the side opposite to the operator ("OOS"), a discarding system 22 for the used foil is arranged. It here comprises a plurality of brushes 24 which cooperate so as to exert a traction force on the used foil.

Discarding system 22 further comprises a waste container 26 into which the used foil is discarded from brushes 24.

It can be seen that discarding system 22 does not require operator attention as it does not have to properly rewind the foil. Rather, the foil is simply withdrawn from the machine and discarded towards container 26.

On the backside of the machine, a blower 30 is arranged which directs an air stream into the gap between the sheet and the foil. It assists the process of separating the foil from the sheet.

As the air flow acts on the used foil, it can be accepted if the air stream to a certain extent damages the foil.

The invention claimed is:

1. A hot foil stamping press comprising:
   a pressing table on which a sheet can be advanced in a feed direction;
   a pressing system for pressing foil onto the sheet;
   a guiding system for guiding foil over the sheet, the guiding system defining a foil transportation path which extends across a path along which the sheet is being advanced in a direction that is transverse to the feed direction;
   a first holder for receiving a first supply of the foil to be supplied to the guiding system;
   a second holder for receiving a second supply of the foil;
   a discarding system for discarding used foil without rewinding the used foil; and
   a blower for separating used foil from the sheet,
   wherein the first holder and the second holder are arranged at an operator side of the hot foil stamping press with the second holder being parallel to the first holder and at a greater height relative to the pressing table than the first holder, the discarding system is arranged at a backside of the hot foil stamping press opposite to the operator side, and the pressing table is arranged between the backside and the operator side, the blower is arranged at the backside of the hot foil stamping press, between the discarding system and the pressing table, and the blower directs an air stream into a gap between the sheet and the used foil such that the air stream acts on the used foil and not on new foil on the sheet, to separate the used foil from the sheet, and the operator side including one or more control elements used for adjusting settings of the hot foil stamping press.

2. The hot foil stamping press of claim 1, wherein the discarding system comprises a brush system for removing the used foil from the hot foil stamping press.

3. The hot foil stamping press of claim 1, wherein the discarding system comprises a waste foil container.

4. The hot foil stamping press of claim 1, wherein settings of the blower are much less critical than with a prior art layout of the blower where the blower acts on the new foil.

5. The hot foil stamping press of claim 1, wherein the pressing system comprises a platen press.

6. A hot foil stamping press comprising:
a pressing table on which a sheet can be advanced in a feed direction;
a pressing system for pressing a foil onto the sheet;
a guiding system for guiding the foil over the sheet along a foil transportation path, the foil transportation path extending across and transverse to the feed direction;
a holder for receiving a supply of the foil;
a blower for separating used foil from the sheet; and
a discarding system for used foil, wherein
the holder is arranged at an operator side of the hot foil stamping press and above the pressing table,
the guiding system is configured to guide the foil in a direction opposite the pressing table after exiting the pressing system,
the blower and the discarding system are arranged at a side of the hot foil stamping press opposite the operator side, the blower being arranged between the discarding system and the pressing table,
and the blower is configured to blow air in a direction that is transverse to the feed direction and into a gap between the used foil and the sheet, such that the air acts on the used foil and not on new foil on the sheet, to separate the used foil from the sheet.

7. The hot foil stamping press of claim 6, wherein the discarding system comprises a brush system for removing the used foil from the hot foil stamping press.

8. The hot foil stamping press of claim 7, wherein the discarding system comprises a waste container and a plurality of brushes that are disposed above the waste container.

9. The hot foil stamping press of claim 8, wherein the discarding system does not rewind used foil.

10. The hot foil stamping press of claim 6, wherein settings of the blower are much less critical than with a prior art layout of the blower where the blower acts on the new foil.

11. The hot foil stamping press of claim 6, wherein the pressing system comprises a platen press.

12. The hot foil stamping press of claim 6, wherein the foil is a thin foil from plastic which has been metallized, or a thin metal foil.

13. The hot foil stamping press of claim 6, wherein the foil transportation path extends over the pressing table of the pressing system.

14. A hot foil stamping press comprising:
a pressing table on which a sheet can be advanced in a feed direction;
a pressing system for pressing a first foil and a second foil onto the sheet;
a guiding system for guiding the first foil and the second foil over the sheet along a foil transportation path, the foil transportation path extending across and transverse to the feed direction;
a first holder for receiving a supply of the first foil and a second holder for received a supply of the second foil;
a discarding system for used foil comprising a waste container; and
a blower for separating used portions of the first foil and used portions of the second foil from the sheet, wherein
the first holder and the second holder are arranged at an operator side of the hot foil stamping press, the supply of the first foil and the supply of the second foil are on an opposite side of the pressing table as the waste container,
the first foil and the second foil travel on the foil transportation path with the first foil between the second foil and the sheet, and
the blower is arranged at a backside of the hot foil stamping press opposite the operator side, between the discarding system and the pressing system, and directs an air stream into a gap between the sheet and the used portions of the first foil and the second foil, such that the air stream acts on the used portions of the first foil and the second foil and not on new foil on the sheet, to separate the used portions of the first foil and the second foil from the sheet.

15. The hot foil stamping press of claim 14, wherein the discarding system comprises a brush system for removing the used foil from the hot foil stamping press.

16. The hot foil stamping press of claim 15, wherein the discarding system comprises a plurality of brushes that are disposed above the waste container.

17. The hot foil stamping press of claim 16, wherein the discarding system does not rewind used foil.

18. The hot foil stamping press of claim 14, wherein either or both of the first foil and the second foil are a thin foil from plastic which has been metallized, or a thin metal foil.

19. The hot foil stamping press of claim 14, wherein the foil transportation path extends over the pressing table of the pressing system.

20. The hot foil stamping press of claim 14, wherein settings of the blower are much less critical than with a prior art layout of blower where the blower acts on the new foil.

* * * * *